US008667489B2

(12) United States Patent
Sobel et al.

(10) Patent No.: US 8,667,489 B2
(45) Date of Patent: Mar. 4, 2014

(54) SYSTEMS AND METHODS FOR SHARING THE RESULTS OF ANALYSES AMONG VIRTUAL MACHINES

(75) Inventors: William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 430 days.

(21) Appl. No.: 12/826,122

(22) Filed: Jun. 29, 2010

(65) Prior Publication Data

US 2011/0321040 A1    Dec. 29, 2011

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ............................................................ 718/1

(58) Field of Classification Search
USPC ............................................................ 718/1
See application file for complete search history.

(56) References Cited

U.S. PATENT DOCUMENTS

| | | | |
|---|---|---|---|
| 7,310,817 B2 | 12/2007 | Hinchliffe et al. | |
| 7,523,487 B2 | 4/2009 | Muhlestein | |
| 2004/0172551 A1 | 9/2004 | Fielding et al. | |
| 2008/0134177 A1* | 6/2008 | Fitzgerald et al. | 718/1 |
| 2008/0263658 A1* | 10/2008 | Michael et al. | 726/22 |
| 2008/0271016 A1* | 10/2008 | Chess et al. | 718/1 |
| 2009/0158432 A1 | 6/2009 | Zheng et al. | |
| 2009/0241194 A1* | 9/2009 | Thomas | 726/24 |

FOREIGN PATENT DOCUMENTS

WO    WO 99/27450    6/1999

OTHER PUBLICATIONS

International Search Report and Written Opinion received in PCT Application No. PCT/US2010/062185 on May 3, 2011.
Uluski, Derek; "Real time anti-virus for a virtualized environment"; Thesis for Master Science; Jan. 1, 2008; pp. I-XI, 1-85; Department of Electrical and Computer Engineering, Northeastern University.
Oberheide, Jon et al.; "CloudAV: N-Version Antivirus in the Network Cloud"; 17th USENIX Security Symposium; Aug. 1, 2008; pp. 91-106, San Jose, CA.
International Search Report received in related International Application No. PCT/US2011/036558; Aug. 19, 2011.
Written Opinion of the International Searching Authority received in related International Application No. PCT/US2011/036558; Aug. 19, 2011.
Danny Quist, et al.; Detecting the Presence of Virtual Machines Using the Local Data Table; Offensive Computing; Dec. 12, 2005; http://www.offensivecomputing.net, as accessed Nov. 4, 2009.

(Continued)

*Primary Examiner* — Andy Ho
*Assistant Examiner* — Timothy A Mudrick
(74) *Attorney, Agent, or Firm* — ALG Intellectual Property, LLC

(57) ABSTRACT

A computer-implemented method may include performing a first analysis on at least one file of a master virtual machine and inserting, into the master virtual machine, information that indicates at least one result of the first analysis. The computer-implemented method may also include maintaining at least one additional virtual machine that is based on the master virtual machine. The computer-implemented method may further include directing the additional virtual machine to reference the information in the master virtual machine instead of performing a second analysis on at least one file of the additional virtual machine. Various other systems, methods, and computer-readable media are also disclosed.

18 Claims, 6 Drawing Sheets

(56) References Cited

OTHER PUBLICATIONS

Dan Upton; Detection and Subversion of Virtual Machines; CS 851—Virtual Machines; May 2006; University of Virginia, as accessed Nov. 4, 2009.

Jason Franklin, et al.; Towards Sound Detection of Virtual Machines; Botnet Detection, Advances in Information Security; Oct. 23, 2007; pp. 89-116; vol. 36; Springer; Springer eBook, as accessed Nov. 4, 2009.

Tal Garfinkel, et al.; A Virtual Machine Introspection Based Architecture for Intrusion Detection; Internet Society's 2003 Symposium on Network and Distributed System Security; 2003; Stanford University, as accessed Nov. 4, 2009.

Youhui Zhang et al.; Virtual-Machine-Based Intrusion Detection on File-Aware Block Level Storage; 18th International Symposium on Computer Architecture and High Performance Computing; Oct. 17-20, 2006; pp. 185-192; http://www.computer.org/portal/web/csdl/doi/10.1109/SBAC-PAD.2006.32, as accessed Nov. 4, 2009.

Tom Liston, et al.; On the Cutting Edge: Thwarting Virtual Machine Detection; 2006; http://www.intelguardians.com, as accessed Nov. 4, 2009.

Written Opinion of the International Searching Authority received in related PCT Application No. PCT/US2010/062185 on Jul. 31, 2012.

James Meyer, et al.; Systems and Methods for Sharing the Results of Computing Operations Among Related Computing Systems; U.S. Appl. No. 12/696,970, filed Jan. 29, 2010.

\* cited by examiner

| Hash | Most-Recent Scan Date | Virus Definition Set | Classification | Classification Rationale | Reputation |
|---|---|---|---|---|---|
| 0xEFCDAB89 | 1/2/2010 | 3.1294 | Malicious | Signature Match | N/A |
| 0x98BAD748 | 11/12/2009 | 2.9234 | Legitimate | | 98% |
| 0x828AB998 | 6/21/2009 | 2.7574 | Legitimate | | N/A |
| 0xBC290F22 | 1/12/2010 | | Untrusted | Low reputation | 9% |

...

File-Attribute Database
120

SYSTEMS AND METHODS FOR SHARING THE RESULTS OF ANALYSES AMONG VIRTUAL MACHINES

BACKGROUND

Virtual machines are often based on a master virtual machine that acts as a template for creating additional virtual machines. In other words, a master virtual machine may be used to create similar or identical virtual machines that include instances of each file located within the master virtual machine. For example, if a master virtual machine includes executable file WINWORD.EXE, each virtual machine that derives from the master virtual machine may also include an instance of the WINWORD.EXE file.

In addition to including instances of each file located within the master virtual machine, virtual machines that are based on the master virtual machine may be programmed to perform one or more of the same analyses as the master virtual machine. For example, if 10 virtual machines derive from the master virtual machine, these virtual machines may be programmed to collectively perform 10 redundant malware analyses on instances of the WINWORD.EXE file even though the master virtual machine has already performed the same malware analysis on the WINWORD.EXE file. Such redundant analyses may consume valuable computing resources and result in decreased system performance.

SUMMARY

As will be described in greater detail below, the instant disclosure generally relates to systems and methods for sharing the results of analyses among virtual machines. More specifically, the systems and methods described herein may enable virtual machines to reference at least one result of an analysis performed on a different virtual machine instead of redundantly performing the same analysis. By sharing the results of analyses among virtual machines, the systems and methods described herein may eliminate redundant analyses and conserve computing resources.

In certain embodiments, a method for sharing the results of analyses among virtual machines may include performing a first analysis (e.g., a malware analysis, a data-loss-prevention analysis, a community-based-reputation analysis, a file-type analysis, or a hash analysis) on at least one file of a master virtual machine. For example, a scanning module may perform a malware analysis on executable file WINWORD.EXE, which is located within a master virtual machine. The scanning module may perform the first analysis on the file of the master virtual machine while the master virtual machine is offline (i.e., while the master virtual machine is not currently running on a host machine).

In order to perform the first analysis on the file while the master virtual machine is offline, a host machine may execute the scanning module external to the master virtual machine. For example, in order to perform the malware analysis on the WINWORD.EXE file while the master virtual machine is not currently running on the host machine, the host machine may execute an anti-malware solution that deploys the scanning module external to the master virtual machine. Additionally or alternatively, if the master virtual machine has been brought online, the master virtual machine may itself execute the scanning module in order to perform the first analysis on the file. For example, while the master virtual machine is currently running on the host machine, the master virtual machine may itself execute an anti-malware solution that deploys the scanning module in order to perform the malware analysis on the WINWORD.EXE file.

Upon performing the first analysis on the file of the master virtual machine, the scanning module may insert, into the master virtual machine, information that indicates at least one result of the first analysis. In some embodiments, this information may be the result itself of the first analysis. For example, upon performing the malware analysis on the WINWORD.EXE file, the scanning module may store at least one result of the malware analysis in a database located within the master virtual machine.

In other embodiments, this information may be a reference to a database that stores the result of the first analysis external to the master virtual machine. For example, upon performing the malware analysis on the WINWORD.EXE file, the scanning module may insert, into the master virtual machine, a uniform resource locator ("URL") that identifies a database that stores at least one result of the malware analysis external to the master virtual machine. The database that stores the result of the first analysis, whether located within or external to the master virtual machine, may be indexed by file hashes. In addition, this database may be referenced by and/or accessible to at least one additional virtual machine that is based on the master virtual machine.

This additional virtual machine may include an instance of each file located within the master virtual machine. For example, an additional virtual machine that is based on the master virtual machine may include an instance of the same WINWORD.EXE file that underwent the malware analysis on the master virtual machine. This additional virtual machine may, for various reasons, need the result of the first analysis performed on the file. However, instead of redundantly performing a second analysis (e.g., an analysis that is similar or identical to the first analysis) on at least one file of the additional virtual machine, a referencing module may direct the additional virtual machine to reference the information in the master virtual machine in order to access the result of the first analysis.

For example, instead of performing the same malware analysis on the instance of the WINWORD.EXE file located within the additional virtual machine, a referencing module may direct the additional virtual machine to reference the information in the master virtual machine in order to access the result of the malware analysis previously performed on the WINWORD.EXE file. The referencing module may program the additional virtual machine to execute computer-executable code that directs the additional virtual machine to reference the information in the master virtual machine. More specifically, when the additional virtual machine needs the result of the first analysis, this computer-executable code may, upon execution, direct the additional virtual machine to generate a request to access the result of the first analysis. The referencing module may receive the request and provide the information in the master virtual machine to the additional virtual machine in response to the request.

In various embodiments, a maintenance module may maintain the additional virtual machine that is based on the master virtual machine. The maintenance module may install, on the additional virtual machine, a software application that is capable of using the result of the first analysis. For example, after the scanning module has performed the malware analysis on the WINWORD.EXE file, the maintenance module may install, on the additional virtual machine, an anti-malware solution that is capable of using the result of the malware analysis performed on the WINWORD.EXE file. The referencing module may then direct the anti-malware solution to use the result of the first analysis instead of performing a second analysis on the file of the additional virtual machine.

In some embodiments, the scanning module may perform the first analysis on the file of the master virtual machine before the additional virtual machine has been brought online for a first time. For example, the scanning module may perform the malware analysis on the WINWORD.EXE file while the additional virtual machine is offline, and in some embodiments, the additional virtual machine may not have been brought online before this malware analysis was performed. In such embodiments, the maintenance module may bring the additional virtual machine online for the first time. After the additional machine has been brought online for the first time, the referencing module may direct the additional virtual machine to reference the information in the master virtual machine instead of performing the second analysis on the file of the additional virtual machine.

In at least one embodiment, the scanning module may perform an additional analysis on at least one file of the additional virtual machine. The additional analysis may be different than the first analysis, and/or the file of the additional virtual machine that is undergoing the additional analysis may be different than the file of the master virtual machine that underwent the first analysis. For example, the scanning module may perform a data-loss-prevention analysis on the instance of the WINWORD.EXE file located within the additional virtual machine. In another example, the scanning module may perform a malware analysis on executable file EXCEL.EXE, which is located within the additional virtual machine. Upon performing the additional analysis, the scanning module may add at least one result of the additional analysis to the database that stores the result of the first analysis.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
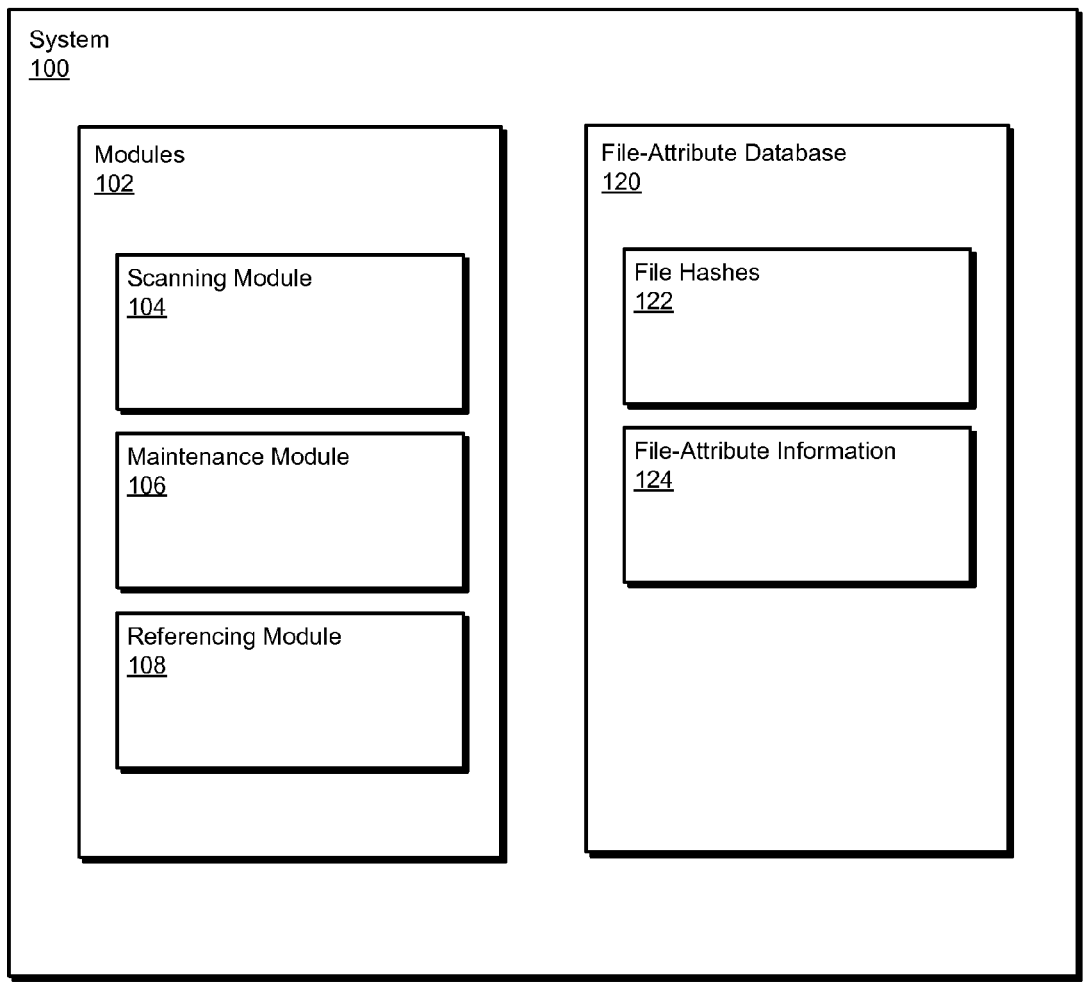
FIG. 1 is a block diagram of an exemplary system for sharing the results of analyses among virtual machines according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for sharing the results of analyses among virtual machines. In particular, the systems and methods described herein may enable virtual machines to reference at least one result of an analysis performed on a different virtual machine instead of redundantly performing the same analysis. The systems and methods described herein may also enable virtual machines to reference the result of the analysis without querying whether the analysis has already been performed on a different virtual machine.

By sharing the results of analyses among virtual machines, the systems and methods described herein may eliminate redundant analyses and conserve computing resources. Embodiments of the instant disclosure may also provide various other features and advantages.

The phrase "master virtual machine," as used herein, generally refers to any virtual machine and/or virtual machine image that is used as a template or base to create one or more additional virtual machines. In some embodiments described herein, the phrase "master virtual machine" may refer to a virtual machine that runs on a host machine when the host machine executes a master virtual machine image (also referred to as a golden image) that is used as a template or base to create one or more additional virtual machine images.

The phrase "additional virtual machine," as used herein, generally refers to any virtual machine and/or virtual machine image that is based on a master virtual machine that acts as a template for creating additional virtual machines. In some embodiments described herein, the phrase "additional virtual machine" may refer to a virtual machine that runs on a host machine when the host machine executes an additional virtual machine image that is based on a master virtual machine image.

In addition, several examples are used throughout the instant disclosure to illustrate particular embodiments of elements (such as a first analysis or file) associated with the systems and methods described herein. However, such examples are only illustrative, and various other examples that are not described herein may also be used in conjunction with these systems and methods. For example, exemplary executable file WINWORD.EXE is used throughout the instant disclosure to illustrate a file that undergoes a first analysis (e.g., a malware analysis) on a master virtual machine, but any other file may also undergo this first analysis on the master virtual machine. The following will provide, with reference to FIGS. 1-2 and 4, detailed descriptions of exemplary systems for sharing the results of analyses among virtual machines. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for sharing the results of analyses among virtual machines. As illustrated in this figure, exemplary system 100 may include one or more modules 102 for performing one or more tasks. For example, and as will be explained in greater detail below, exemplary system 100 may include a scanning module 104 programmed to perform a first analysis on at least one file of a master virtual machine. Scanning module 104 may also be programmed to insert, into the master virtual machine, information that indicates at least one result of the first analysis.

In addition, and as will be described in greater detail below, exemplary system 100 may include a maintenance module 106 programmed to maintain at least one additional virtual machine that is based on the master virtual machine. Exemplary system 100 may also include a referencing module 108 programmed to direct the additional virtual machine to reference the information in the master virtual machine instead of performing a second analysis on at least one file of the additional virtual machine. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., master virtual machine 202 and additional virtual machines 204(1)-(N)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a file-attribute database 120. In one embodiment, and as will be explained in greater detail below, file-attribute database 120 may be configured to store file hashes 122 and file-attribute information 124. File hashes 122 may be used to identify files located within master virtual machine 202 and/or additional virtual machines 204(1)-(N) in FIG. 2, and file-attribute information 124 may include one or more results of analyses performed on such files. File-attribute database 120 may represent portions of a single database or computing device or a plurality of databases or computing devices.

Figure 2:
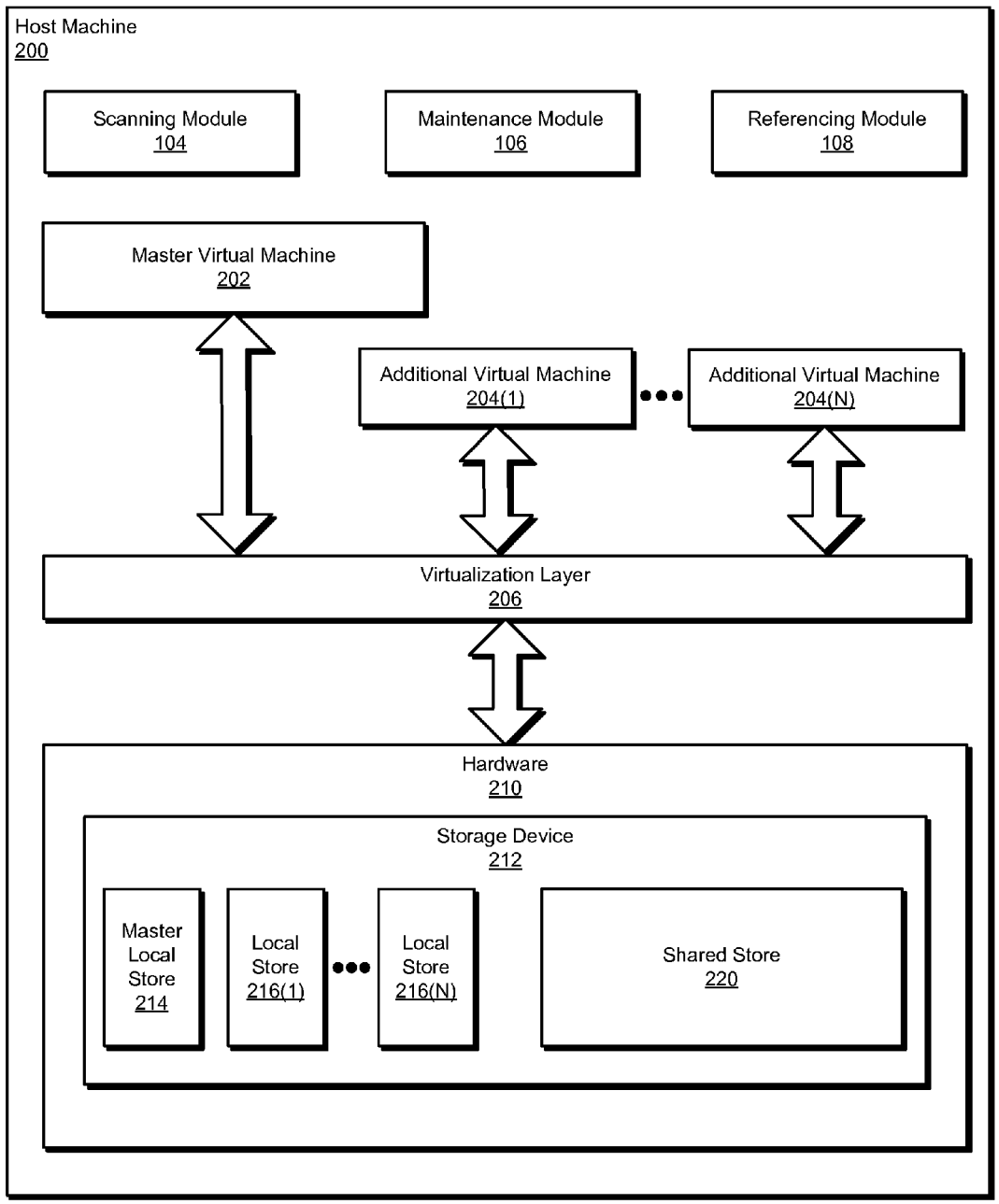
FIG. 2 is a block diagram of another exemplary system for sharing the results of analyses among virtual machines according to at least one embodiment.
Figure 5:
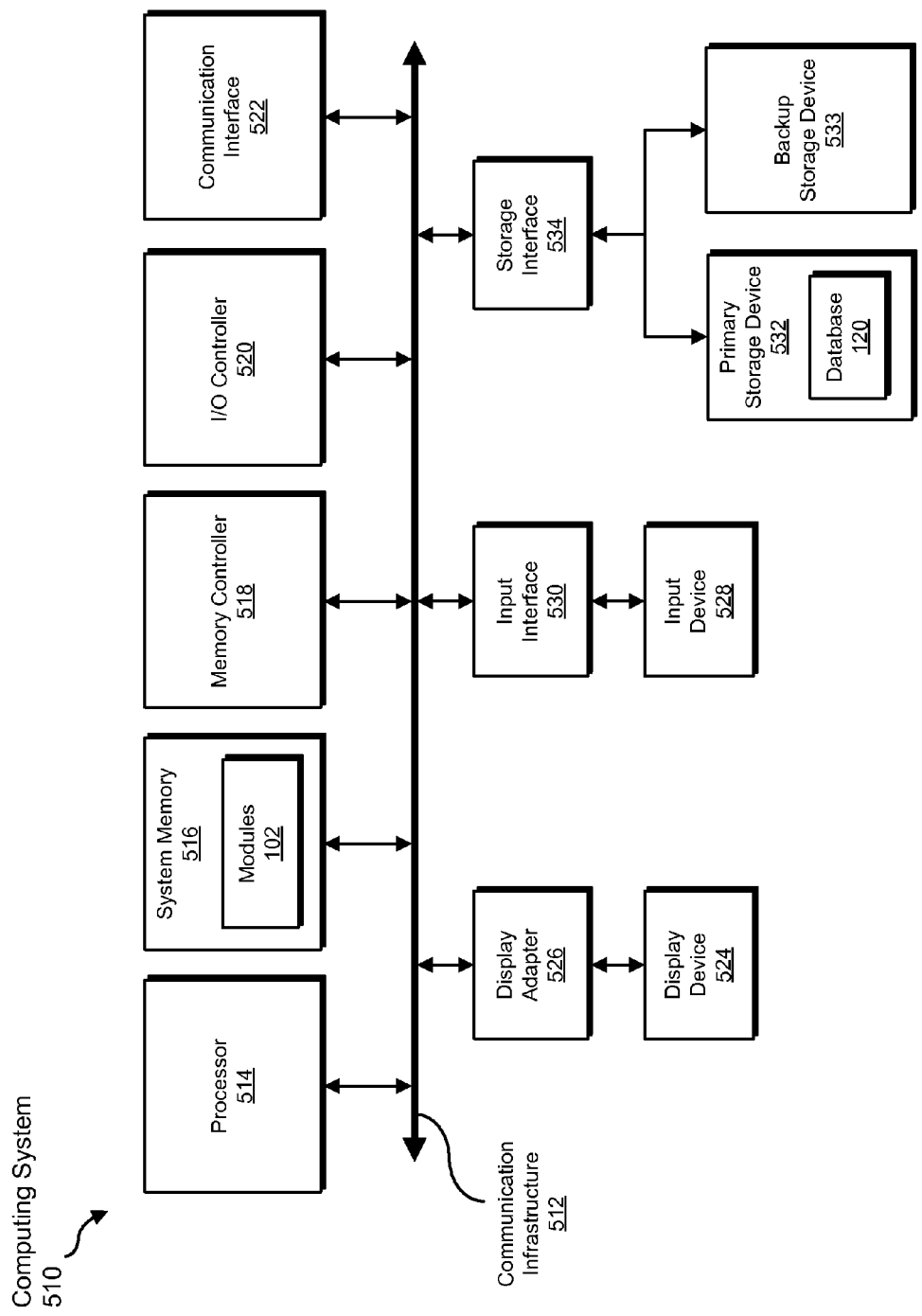
FIG. 5 is a block diagram of an exemplary computing system capable of implementing one or more of the embodiments described and/or illustrated herein.
Figure 6:
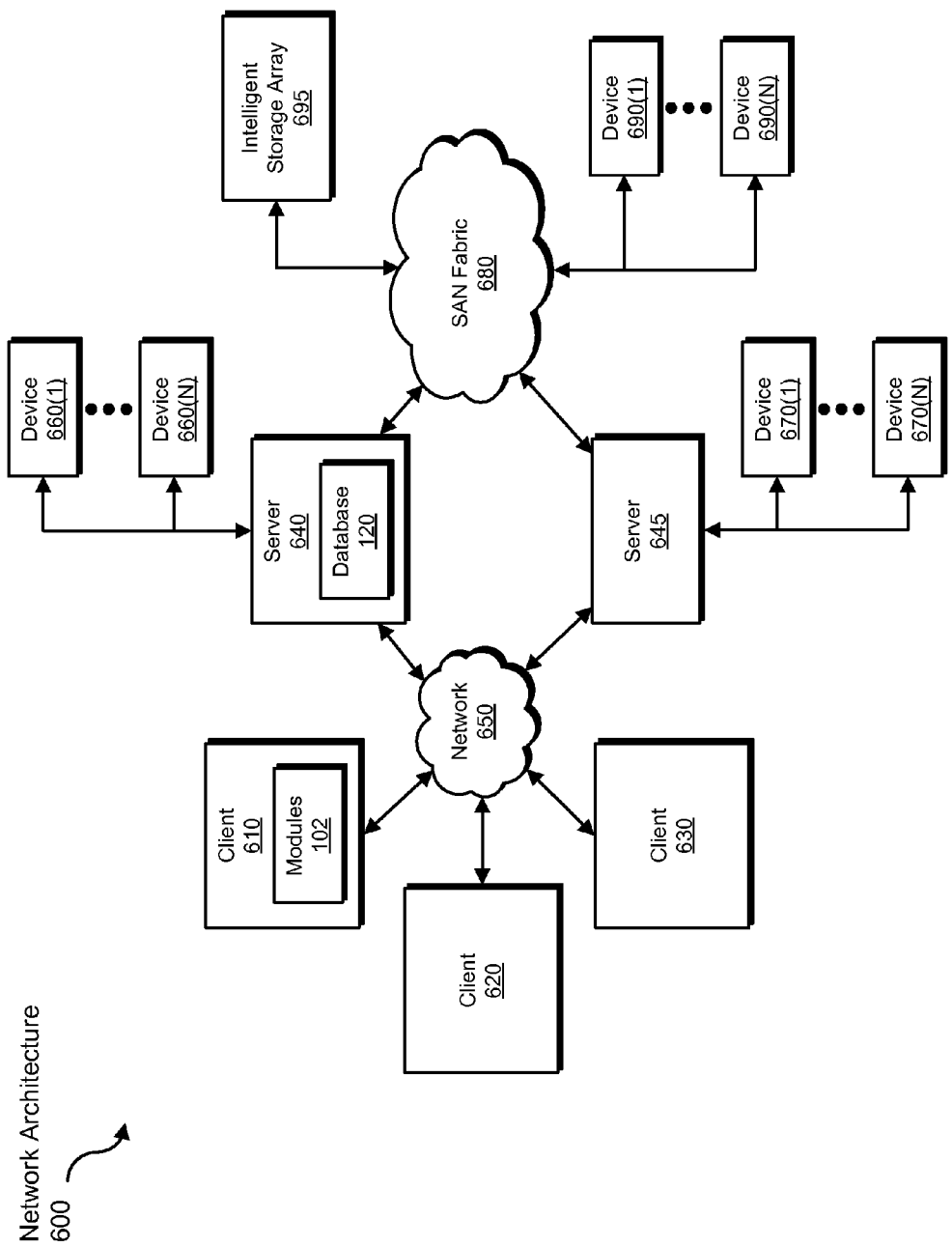
FIG. 6 is a block diagram of an exemplary computing network capable of implementing one or more of the embodiments described and/or illustrated herein.

For example, file-attribute database 120 may represent a portion of master local store 214, local stores 216(1)-(N), and/or shared store 220 in FIG. 2, computing system 510 in FIG. 5, and/or portions of exemplary network architecture 600 in FIG. 6. Alternatively, file-attribute database 120 in FIG. 1 may represent one or more physically separate devices capable of being accessed by a computing device, such as master virtual machine 202 and/or additional virtual machines 204(1)-(N) in FIG. 2, computing system 510 in FIG. 5, and/or portions of exemplary network architecture 600 in FIG. 6.

Exemplary system 100 in FIG. 1 may be deployed in a variety of ways. In one example, all or a portion of exemplary system 100 may represent portions of an exemplary host machine 200 in FIG. 2. As shown in FIG. 2, host machine 200 may include a master virtual machine 202 and a plurality of additional virtual machines 204(1)-(N) in communication with hardware 210 via a virtualization layer 206. In one embodiment, and as will be described in greater detail below, modules 102 in FIG. 1 may program host machine 200 and/or master virtual machine 202 to perform an analysis on at least one file of a master virtual machine.

In addition, modules 102 may program one or more portions of host machine 200 to insert, into master virtual machine 202, information that indicates at least one result of the first analysis. Modules 102 may also program one or more portions of host machine 200 to maintain one or more additional virtual machines 204(1)-(N) and direct additional virtual machines 204(1)-(N) to reference the information in master virtual machine 202 instead of performing a second analysis on at least one file of additional machines 204(1)-(N).

Host machine 200 generally represents any type or form of physical computing device capable of hosting one or more virtual machines. Examples of host machine 200 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Master virtual machine 202 generally represents any type or form of virtualized or emulated computing machine that is capable of reading computer-executable instructions and acting as a template for creating one or more additional virtual machines. Examples of master virtual machine 202 include, without limitation, system virtual machines, process virtual machines, or any other suitable virtual or emulated computing device. In the example illustrated in FIG. 2, master virtual machine 202 may access underlying hardware 210 of host machine 200 via virtualization layer 206, which may abstract and manage the computing resources of host machine 200.

Additional virtual machines 204(1)-(N) generally represent any type or form of virtualized or emulated computing machine that is based on master virtual machine 202 and capable of reading computer-executable instructions. Examples of additional virtual machines 204(1)-(N) include, without limitation, system virtual machines, process virtual machines, or any other suitable virtual or emulated computing device. In the example illustrated in FIG. 2, additional virtual machines 204(1)-(N) may access underlying hardware 210 of host machine 200 via virtualization layer 206, which may include a hypervisor and/or any other virtualization software programmed to abstract and manage the computing resources of host machine 200.

As illustrated in FIG. 2, hardware 210 may include, among other elements, at least one storage device 212. In some embodiments, virtualization layer 206 may abstract hardware 210 into a master local store 214 for master virtual machine 202 and a plurality of local stores 216(1)-(N) for each of additional virtual machines 204(1)-(N). As such, master local store 214 may appear to be part of master virtual machine 202, and local stores 216(1)-(N) may appear to be part of additional virtual machines 204(1)-(N). As will be described in greater detail below, master local store 214 and local stores 216(1)-(N) may be used to store file-attribute database 120, including file hashes 122 and file-attribute information 124.

Shared store 220 generally represents any type or form of physical or virtualized storage located within host machine 200 that may be shared or accessed by master virtual machine 202 and/or additional virtual machines 204(1)-(N). Unlike master local store 214 and local stores 216(1)-(N), shared store 220 may appear to be separate from master virtual machine 202 and additional virtual machines 204(1)-(N). However, similar to master local store 214 and local stores 216(1)-(N), shared store 220 may be used to store file-attribute database 120, including file hashes 122 and file-attribute information 124.

While FIG. 2 shows shared store 220 being on the same system as master virtual machine 202 and additional virtual machines 204(1)-(N), in other embodiments shared store 220 may be located on a separate system. For example, shared store 220 may be located on a remote storage device accessible by master virtual machine 202 and additional virtual machines 204(1)-(N) over a network (e.g., the Internet, a local area network, a wide area network, etc.).

Figure 4:
FIG. 4 is an block diagram of an exemplary file-attribute database.

Master local store 214, local stores 216(1)-(N), and/or shared store 220 may include a file-attribute database (such as file-attribute database 120 in FIGS. 1 and 4). In some examples, this file-attribute database may contain a hash of a file, at least one result of an analysis performed on the file (such as a classification assigned to the file during a malware analysis), at least one rationale for the result of the analysis, at least one set of parameters used to perform the analysis (such as a virus definition set or heuristic), a date on which the analysis was performed, and/or any other potentially useful information that may be shared among virtual machines.

Figure 3:
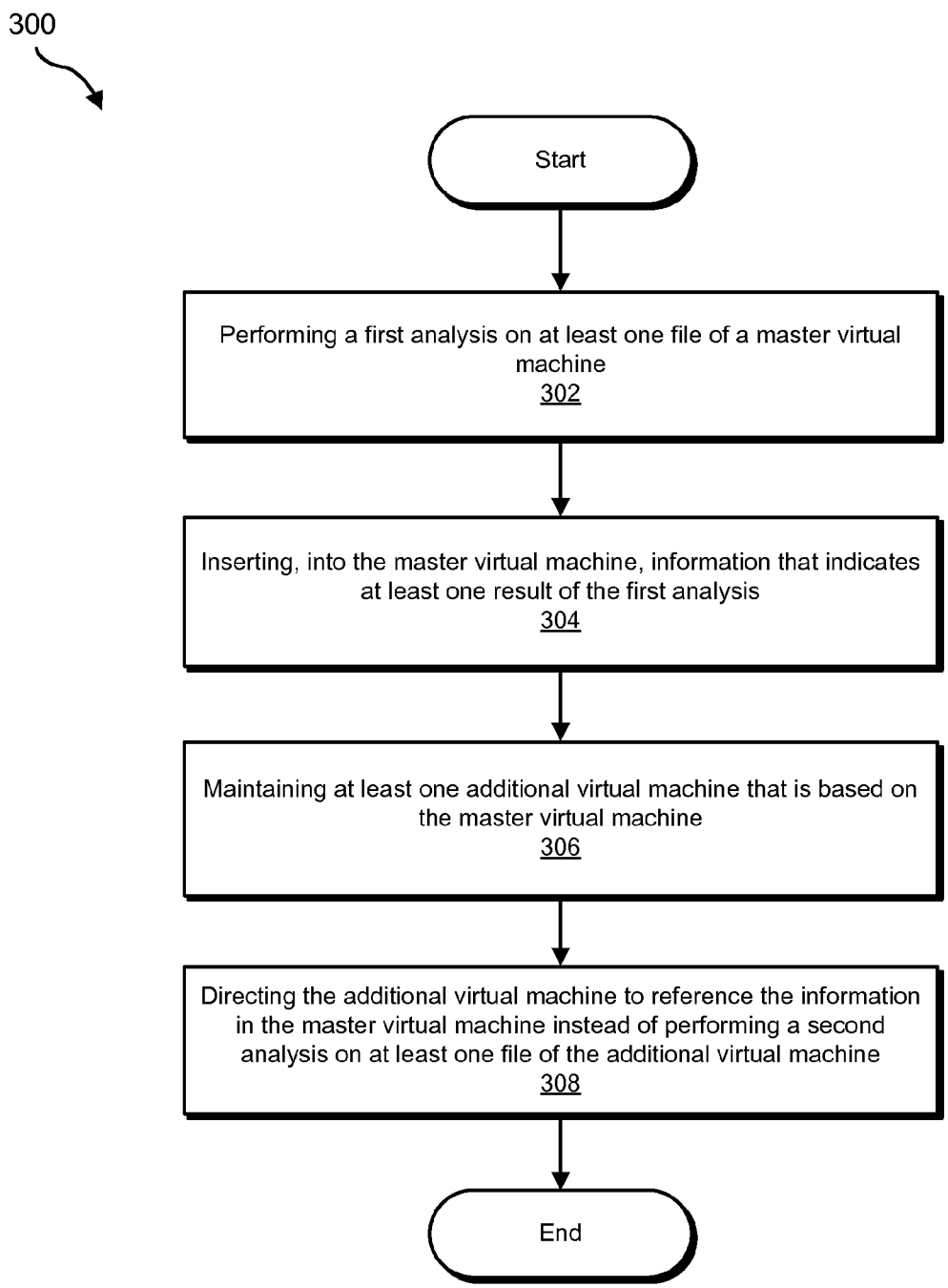
FIG. 3 is a flow diagram of an exemplary method for sharing the results of analyses among virtual machines according to at least one embodiment.

FIG. 3 is a flow diagram of an exemplary computer-implemented method 300 for sharing the results of analyses among virtual machines. The steps shown in FIG. 3 may be performed by any suitable computer-executable code and/or computing system. In some embodiments, the steps shown in FIG. 3 may be performed by one or more of the components of system 100 in FIG. 1 and/or host machine 200 in FIG. 2. For example, at step 302, scanning module 104 may, as part of host machine 200, perform a first analysis on at least one file of master virtual machine 202.

Step 302 may be performed in a variety of ways. In at least one embodiment, scanning module 104 may perform the first analysis on the file while master virtual machine 202 is offline. For example, scanning module 104 may perform a malware analysis on executable file WINWORD.EXE located within master virtual machine 202 while master virtual machine 202 is not currently running on host machine 200. Scanning module 104 may also perform the first analysis on master virtual machine 202 even before master virtual machine 202 has been brought online for a first time. In this example, scanning module 104 may perform the malware analysis on the WINWORD.EXE file of master virtual machine 202 immediately upon creation of master virtual machine 202.

In order to perform the first analysis on the file while master virtual machine 202 is offline, host machine 200 may execute scanning module 104 external to master virtual machine 202. For example, in order to perform the malware analysis on the WINWORD.EXE file while master virtual machine 202 is not currently running on host machine 200, host machine 200 may execute an anti-malware solution that deploys scanning module 104 external to master virtual machine 202. Additionally or alternatively, if master virtual machine 202 has been brought online, master virtual machine 202 may itself execute scanning module 104 in order to perform the first analysis on the file. For example, while master virtual machine 202 is currently running on host machine 200, master virtual machine 202 may itself execute an anti-malware solution that deploys scanning module 104 in order to perform the malware analysis on the WINWORD.EXE file.

The first analysis may be any of a variety of computer-based analyses. Examples of performing the first analysis on the file include, without limitation, performing a malware analysis on the file, performing a data-loss-prevention analysis on the file, performing a file-type analysis on the file, hashing the file, and/or performing any other suitable analysis on the file.

At step 304 in FIG. 3, scanning module 104 may insert, into master virtual machine 202, information that indicates at least one result of the first analysis. Step 304 may be performed in a variety of ways. In certain embodiments, scanning module 104 may insert, into master virtual machine 202, the result of the first analysis performed on the file of master virtual machine 202. In other words, this information that indicates the result of the first analysis may be the result of the first analysis.

Scanning module 104 may store the result of the first analysis in a database located within master virtual machine 202. For example, upon performing the malware analysis on the WINWORD.EXE file, scanning module 104 may store a result of the malware analysis (such as a classification assigned to the WINWORD.EXE file) in file-attribute database 120 located within master local store 214 of master virtual machine 202. In this example, virtualization layer 206 may abstract master local store 214 into appearing to be part of master virtual machine 202, effectively storing file-attribute database 120 within master virtual machine 202.

In some embodiments, rather than inserting the result of the first analysis into master virtual machine 202, scanning module 104 may insert, into master virtual machine 202, a reference to a database that stores the result of the first analysis external to master virtual machine 202. In other words, the information that indicates the result of the first analysis may be the reference to the database that stores the result of the first analysis external to master virtual machine 202. For example, upon performing the malware analysis on the WINWORD.EXE file, scanning module 104 may store a result of the malware analysis (such as a classification assigned to the WINWORD.EXE file) in file-attribute database 120 located within shared store 220 and external to master virtual machine 202. In this example, scanning module 104 may then insert, into master virtual machine 202, a URL that identifies and facilitates access to file-attribute database 120 located within shared store 220.

The database that stores the result of the first analysis (e.g., file-attribute database 120), whether located within or external to master virtual machine 202, may be indexed by file hashes 122. For example, file hash "0x98BAD748" in file hashes 122 may represent the WINWORD.EXE file, and the result of the malware analysis performed on the WINWORD.EXE file may be identified by locating the "0x98BAD748" hash within file-attribute database 120. File hashes 122 may be accessible to and used by various virtual machines running on host machine 200 (e.g., master virtual machine 202 and/or additional virtual machines 204(1)-(N)). File hashes 122 may enable such virtual machines to locate the result of the first analysis within file-attribute database 120.

In at least one embodiment, scanning module 104 may create a hash of a file upon encountering the file for the first time. As such, regardless of whether the file is located within master virtual machine 202 and/or one or more additional virtual machines 204, scanning module 104 may create the hash of the file a single time even though scanning module 104 may encounter a different instance of the same file on a different virtual machine at a subsequent time. For example, scanning module 104 may create the "0x98BAD748" hash upon encountering the WINWORD.EXE file for the first time on master virtual machine 202 and then include the "0x98BAD748" hash in file hashes 122. In this example, additional virtual machines 204(1)-(N) in FIG. 2 may also access the "0x98BAD748" hash in file hashes 122 to locate the result of the malware analysis in file-attribute database 120 instead of creating another instance of the "0x98BAD748" hash upon encountering the WINWORD.EXE file for the second time.

In order to provide additional virtual machines 204(1)-(N) with access to file hashes 122, scanning module 104 may cache copies of file hashes 122 in local stores 216(1)-(N) or shared store 220. For example, each of local stores 216(1)-(N) may include cached copies of file hashes 122, and each of additional virtual machines 204(1)-(N) may use a copy of the "0x98BAD748" hash to locate, in file-attribute information 124, the result of the malware analysis performed on the WINWORD.EXE file. Such cached copies of file hashes 122 may enable additional virtual machines 204(1)-(N) to locate the result of the first analysis in file-attribute database 120 without creating a redundant instance of a file hash each time a previously hashed file is encountered by scanning module 104.

If file hashes 122 exist prior to creation of additional virtual machines 204(1)-(N), copies of file hashes 122 may be included in each of additional virtual machines 204(1)-(N) upon creation of each of additional virtual machines 204(1)-(N). For example, if file hashes 122 are included in master virtual machine 202, file hashes 122 may be included in each of additional virtual machines 204(1)-(N) upon creation of each of additional virtual machines 204(1)-(N). File hashes 122 may represent files located within master virtual machine 202, and these copies of file hashes 122 may be included in each of additional virtual machines 204(1)-(N) along with instances of the files located within master virtual machine 202.

At step 306 in FIG. 3, maintenance module 106 may maintain at least one of additional virtual machines 204(1)-(N) (e.g., additional virtual machine 204(1)) that is based on master virtual machine 202. Additional virtual machine 204(1) may include an instance of each file located within master virtual machine 202. For example, maintenance module 106 may maintain additional virtual machine 204(1), which is based on master virtual machine 202 and includes an instance of the same WINWORD.EXE file that underwent the malware analysis on master virtual machine 202.

In certain embodiments, maintenance module 106 may maintain additional virtual machine 204(1) as a differential virtual machine that uses master virtual machine 202 as a base image and stores only differences between additional virtual machine 204(1) and master virtual machine 202. For example, maintenance module 106 may modify additional virtual machine 204(1) to include one or more additional files, software applications, and/or data that are not included in master virtual machine 202. In this example, maintenance module 106 may store these differences (i.e., the additional files, software applications, and/or data) in local store 216(1) associated with additional virtual machine 204(1).

In other embodiments, maintenance module 106 may maintain additional virtual machine 204(1) as a clone virtual machine that is identical to master virtual machine 202. In other words, maintenance module 106 may incorporate, into additional virtual machine 204(1), only those files, software applications, and/or data included in master virtual machine 202. Maintenance module 106 may store one or more of the files, software applications, and/or data associated with additional virtual machine 204(1) in local store 216(1) or shared store 220. Additionally or alternatively, maintenance module 106 may reference one or more of these files, software applications, and/or data in master local store 214.

At step 308 in FIG. 3, referencing module 108 may direct additional virtual machine 204(1) to reference the information in master virtual machine 202 instead of performing a second analysis (e.g., an analysis that is similar or identical to the first analysis) on at least one file of additional virtual machine 204(1) (e.g., a file that is similar or identical to the file of master virtual machine 202). In other words, additional virtual machine 204(1) may use the result of the first analysis performed on the file located within master virtual machine 202 instead of deploying scanning module 104 to perform a similar or identical analysis on a different instance of the same file located within additional virtual machine 204(1). For example, instead of performing the same malware analysis on the instance of the WINWORD.EXE file located within additional virtual machine 204(1), referencing module 108 may direct additional virtual machine 204(1) to reference the information in master virtual machine 202 in order to access the result of the malware analysis previously performed on the WINWORD.EXE file.

Referencing module 108 may program additional virtual machine 204(1) to execute computer-executable code that directs additional virtual machine 204(1) to reference the information in master virtual machine 202. In some embodiments, this computer-executable code may be a plug-in for a software application (e.g., an anti-malware solution) associated with additional virtual machine 204(1). In other embodiments, this computer-executable code may be an independent software application that directs additional virtual machine 204(1) to reference the information in master virtual machine 202.

When additional virtual machine 204(1) needs the result of the first analysis, this computer-executable code may, upon execution, direct additional virtual machine 204(1) to generate a request to access the result of the first analysis. For example, referencing module 108 may insert, into additional virtual machine 204(1), computer-executable code that directs an anti-malware solution to generate a request to access the result of the malware analysis performed on the WINWORD.EXE file whenever the anti-malware solution needs to use or evaluate the result of the malware analysis. Referencing module 108 may then receive the request and provide, in response to the request, the information in master virtual machine 202.

In certain embodiments, scanning module 104 may perform the first analysis on the file of master virtual machine 202 before additional virtual machine 204(1) has been brought online for a first time. For example, scanning module 104 may perform the malware analysis on the WINWORD.EXE file while additional virtual machine 204(1) is offline, and additional virtual machine 204(1) may not have been brought online before this malware analysis was performed. Maintenance module 106 may then bring additional virtual machine 204(1) online for the first time. After additional virtual machine 204(1) has been brought online for the first time, referencing module 108 may direct additional virtual machine to immediately reference the information in master virtual machine 202 instead of performing the second analysis on the file of additional virtual machine 204(1).

In one or more embodiments, maintenance module 106 may maintain additional virtual machine 204(1) by installing, on additional virtual machine 204(1), a software application that is capable of using the result of the first analysis. For example, after scanning module 104 has performed the malware analysis on the WINWORD.EXE file, maintenance module 106 may install, on additional virtual machine 204(1), an anti-malware solution that is capable of using the result of the malware analysis performed on the WINWORD.EXE file. Referencing module 108 may then direct the software application to use the result of the first analysis instead of performing the second analysis on the file of additional virtual machine 204(1).

Upon completion of step 308 in FIG. 3, exemplary method 300 may terminate. However, although not illustrated in FIG. 3, the exemplary method may include one or more additional steps. In various embodiments, scanning module 104 may perform an additional analysis on at least one file of additional virtual machine 204(1).

The additional analysis may be different than the first analysis, and/or the file of additional virtual machine 204(1) that is undergoing the additional analysis may be different than the file of master virtual machine 202 that underwent the first analysis. For example, scanning module 104 may perform a data-loss-prevention analysis on the instance of the WINWORD.EXE file located within additional virtual machine 204(1). In another example, scanning module 104 may perform a malware analysis on executable file EXCEL.EXE, which is located within additional virtual machine 204(1). Upon performing the additional analysis, scanning module 104 may add at least one result of the additional analysis to file-attribute database 120, which stores the result of the first analysis.

In those embodiments in which the database that stores the result of the first analysis is located external to master virtual machine 202, scanning module 104 may insert the result of the first analysis in the database even after creation of additional virtual machine 204(1). In other words, when the reference inserted into master virtual machine 202 identifies the database that stores the result of the first analysis external to master virtual machine 202, scanning module 104 may still update the database with results of analyses after additional virtual machine 204(1) has been created from master virtual machine 202. For example, if the first analysis were a community-based-reputation analysis performed on the WINWORD.EXE file, scanning module 104 may still update the result of the first analysis (i.e., update the community-based reputation of the WINWORD.EXE file) even after creation of additional virtual machine 204(1) based on master virtual machine 202.

FIG. 4 is a block diagram of an exemplary file-attribute database 120 that may, as detailed above, represent a portion of master local store 214 and/or shared store 220 in FIG. 2. As illustrated in FIG. 4, file-attribute database 120 may contain information that identifies, for each of a plurality of files, a hash of the file, a most-recent scan date for the file, a virus definition set used during the most-recent scan of the file, a classification assigned to the file during the scan, at least one rationale for the classification assigned to the file during the scan, and community-based-reputation information for the file.

In some examples, additional virtual machine 204(1) may access file-attribute database 120 within master local store 214 and/or shared store 220 in order to retrieve file-attribute information 124 for a particular file. For example, referencing module 108 in FIG. 1 may, as part of additional virtual machine 204(1) in FIG. 2, access shared store 220 containing file-attribute database 120 in order to retrieve file-attribute information 124 associated with the "0x98BAD748" hash, which represents the WINWORD.EXE file. Since file-attribute database 120 includes file-attribute information 124, additional virtual machine 204(1) may retrieve file-attribute information 124 for the file instead of performing an analysis on the file that produces at least one result that is similar or identical to the result of the first analysis.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the performing, inserting, maintaining, directing, storing, adding, programming, bringing, receiving, providing, installing, and hashing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as performing, inserting, maintaining, directing, storing, adding, programming, bringing, receiving, providing, installing, and hashing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the performing, inserting, maintaining, directing, storing, adding, programming, bringing, receiving, providing, installing, and hashing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the performing, inserting, maintaining, directing, storing, adding, programming, bringing, receiving, providing, installing, and hashing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the performing, inserting, maintaining, directing, storing, adding, programming, bringing, receiving, providing, installing, and hashing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, databases 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the performing, inserting, maintaining, directing, storing, adding, programming, bringing, receiving, providing, installing, and hashing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the performing, inserting, maintaining, directing, storing, adding, programming, bringing, receiving, providing, installing, and hashing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for sharing the results of analyses among virtual machines.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, scanning module 104 in FIG. 1 may transform a property or characteristic of master local store 214 and/or shared store 220 in FIG. 2 by updating or storing the results of analyses performed by scanning module 104 within such stores.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for sharing the results of analyses among virtual machines, at least a portion of the method being performed by a computing device comprising at least one processor, the method comprising:
   providing a scanning module that is external to:
      a master virtual machine;
      at least one additional virtual machine that is based on the master virtual machine;
   using the scanning module to:
      perform a first analysis on a file of the master virtual machine;
      create a hash of the file of the master virtual machine prior to creation of the additional virtual machine;
      insert the hash of the file into the additional virtual machine upon creation of the additional virtual machine;
      insert information that indicates at least one result of the first analysis performed on the file into a database of the master virtual machine;
      index the information that indicates the result of the first analysis in the database of the master virtual machine based at least in part on the hash of the file;
   while the additional virtual machine is offline, programming the additional virtual machine to reference the information indexed in the database of the master virtual machine once the additional virtual machine is brought online instead of performing a second analysis that is redundant to the first analysis on the additional virtual machine by:
      accessing the hash of the file inserted in the additional virtual machine;
      locating the information indexed in the database of the master virtual machine based at least in part on the hash of the file.

2. The method of claim 1, wherein inserting the information that indicates the result of the first analysis into the database of the master virtual machine comprises storing the result of the first analysis in a database located within the master virtual machine.

3. The method of claim 1, wherein inserting the information that indicates the result of the first analysis into the database of the master virtual machine comprises inserting a uniform resource locator (URL) that identifies a database that stores the result of the first analysis external to the master virtual machine.

4. The method of claim 1, further comprising using the scanning module to:
   perform an additional analysis on the additional virtual machine;
   add at least one result of the additional analysis to the database of the master virtual machine.

5. The method of claim 1, wherein performing the first analysis on the file of the master virtual machine comprises performing the first analysis on the file of the master virtual machine while the master virtual machine is offline.

6. The method of claim 1, wherein performing the first analysis on the file of the master virtual machine comprises performing, prior to bringing the additional virtual machine online for a first time, the first analysis on the file of the master virtual machine while the additional virtual machine is offline.

7. The method of claim 6, further comprising:
   bringing the additional virtual machine online for the first time;
   upon bringing the additional virtual machine online for the first time, directing the additional virtual machine to reference the information indexed in the database of the master virtual machine based at least in part on the hash of the file instead of performing the second analysis on the additional virtual machine.

8. The method of claim 1, further comprising:
   receiving, from the additional virtual machine, a request to access the result of the first analysis;
   providing, in response to the request, the information indexed in the database of the master virtual machine.

9. The method of claim 1, further comprising:
   installing, on the additional virtual machine, a software application that is capable of using the result of the first analysis;
   directing the software application to use the result of the first analysis by accessing the information indexed in the database of the master virtual machine based at least in part on the hash of the file instead of performing the second analysis on the additional virtual machine.

10. The method of claim 1, wherein performing the first analysis on the file of the master virtual machine comprises at least one of:
    performing a malware analysis on the file of the master virtual machine;
    performing a data-loss-prevention analysis on the file of the master virtual machine;
    performing a community-based-reputation analysis on the file of the master virtual machine;
    performing a file-type analysis on the file of the master virtual machine.

11. The method of claim 1, wherein programming the additional virtual machine to reference the information indexed in the database of the master virtual machine comprises programming a software application included in the additional virtual machine with a plug-in that directs the software application to reference the information inserted into the master virtual machine.

12. The method of claim 11, wherein programming the software application included in the additional virtual machine with the plug-in comprises directing the software application to access the information indexed in the database of the master virtual machine to identify the result of the first analysis instead of performing the second analysis that is redundant to the first analysis when the software application needs to use the result of the first analysis.

13. The method of claim 1, wherein programming the additional virtual machine to reference the information indexed in the database of the master virtual machine comprises:
  caching a copy of the hash of the file in a store accessible to the additional virtual machine;
  programming the additional virtual machine to:
    access the hash of the file cached in the store instead of creating another hash of the file;
    locate the information indexed in the database of the master virtual machine based at least in part on the hash of the file.

14. The method of claim 1, wherein using the scanning module to create the hash of the file comprises using the scanning module to create the hash of the file upon encountering the file for a first time.

15. A system for sharing the results of analyses among virtual machines, the system comprising:
  at least one processor;
  a scanning module that is external to:
    a master virtual machine;
    at least one additional virtual machine that is based on the master virtual machine;
  wherein the scanning module is programmed to direct the processor to:
    perform a first analysis on a file of the master virtual machine;
    create a hash of the file of the master virtual machine prior to creation of the additional virtual machine;
    insert the hash of the file into the additional virtual machine upon creation of the additional virtual machine;
    insert information that indicates at least one result of the first analysis performed on the file into a database of the master virtual machine;
    index the information that indicates the result of the first analysis in the database of the master virtual machine based at least in part on the hash of the file;
  a referencing module programmed to direct the processor to:
    program, while the additional virtual machine is offline, the additional virtual machine to reference the information indexed in the database of the master virtual machine once the additional virtual machine is brought online instead of performing a second analysis that is redundant to the first analysis on the additional virtual machine by:
      accessing the hash of the file inserted in the additional virtual machine;
      locating the information indexed in the database of the master virtual machine.

16. The system of claim 15, wherein the scanning module is programmed to direct the processor to store the result of the first analysis in a database located within the master virtual machine.

17. The system of claim 15, wherein the scanning module is programmed to direct the processor to insert a URL that identifies a database that stores the result of the first analysis external to the master virtual machine.

18. A non-transitory computer-readable medium comprising one or more computer-executable instructions that, when executed by a computing device, cause the computing device to:
  provide a scanning module that is external to:
    a master virtual machine;
    at least one additional virtual machine that is based on the master virtual machine;
  use the scanning module to:
    perform a first analysis on the file of the master virtual machine;
    create a hash of the file of the master virtual machine prior to creation of the additional virtual machine;
    insert the hash of the file into the additional virtual machine upon creation of the additional virtual machine;
    insert information that indicates at least one result of the first analysis performed on the file into a database of the master virtual machine;
    index the information that indicates the result of the first analysis in the database of the master virtual machine based at least in part on the hash of the file;
  program, while the additional virtual machine is offline, the additional virtual machine to reference the information indexed in the database of the master virtual machine based at least in part on the hash of the file once the additional virtual machine is brought online instead of performing a second analysis that is redundant to the first analysis on the additional virtual machine by:
    accessing the hash of the file inserted in the additional virtual machine;
    locating the information indexed in the database of the master virtual machine based at least in part on the hash of the file.

* * * * *